(12) United States Patent
Bear et al.

(10) Patent No.: US 7,424,740 B2
(45) Date of Patent: Sep. 9, 2008

(54) METHOD AND SYSTEM FOR ACTIVATING A COMPUTER SYSTEM

(75) Inventors: Eric Gould Bear, Bellevue, WA (US); Chad Magendanz, Issaquah, WA (US); Aditha May Adams, Seattle, WA (US); Carl Ledbetter, Mercer Island, WA (US); Steve Kaneko, Medina, WA (US); Chris Schoppa, Redmond, WA (US); Adrian Chandley, Sammamish, WA (US); William J. Westerinen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 807 days.

(21) Appl. No.: 10/430,369

(22) Filed: May 5, 2003

(65) Prior Publication Data

US 2004/0225892 A1    Nov. 11, 2004

(51) Int. Cl.
*G06F 7/04* (2006.01)
*G06F 1/26* (2006.01)
(52) U.S. Cl. .................. 726/20; 713/320; 713/321; 713/323; 713/324; 713/340; 713/185; 713/186; 726/2; 726/9
(58) Field of Classification Search .............. 726/2, 726/20, 9, 36; 713/323, 300, 324, 185, 186, 713/320, 321, 340
See application file for complete search history.

(56) References Cited

U.S. PATENT DOCUMENTS

| 4,860,342 | A | 8/1989 | Danner ................. 379/96 |
| 5,159,445 | A | 10/1992 | Gitlin |
| 5,412,417 | A | 5/1995 | Tozuka |
| 5,487,181 | A | 1/1996 | Dailey et al. |
| 5,519,722 | A | 5/1996 | Akman |
| 5,533,115 | A | 7/1996 | Hollenbach |

(Continued)

FOREIGN PATENT DOCUMENTS

EP    0772327 A2    5/1997

(Continued)

OTHER PUBLICATIONS

Oxford on-line dictionary, http://dictionary.oed.com/entrance.dtl, Oxford University Press 2007, on the definition of the word "physical" under III/7b.*

(Continued)

*Primary Examiner*—Kimyen Vu
*Assistant Examiner*—April Y Shan
(74) *Attorney, Agent, or Firm*—Workman Nydegger

(57) ABSTRACT

A system and method for improved activation of a personal computer and/or other processing devices is provided. Power and security states are combined and further reduced to three activation states which may be operated by a single secure device. The system may include any number of activation states for operating the computer using only the single secure device. The secure access device handles both security and power management by authenticating physical access to the computer and the identity of the user. For this purpose, a device containing a biometric reader may be integrated with a smart card and the biometric identification used as an authentication code to secure the smartcard. The secure access device may be inserted into a locking mechanism used by the user to transition between activation states.

17 Claims, 6 Drawing Sheets

U.S. PATENT DOCUMENTS

| | | | |
|---|---|---|---|
| 5,546,538 A | 8/1996 | Cobbley | |
| 5,568,540 A | 10/1996 | Grecko | 379/88.25 |
| 5,657,414 A | 8/1997 | Lett | |
| 5,675,374 A | 10/1997 | Kohda | 348/14.1 |
| 5,675,810 A | 10/1997 | Sellers | |
| 5,768,164 A | 6/1998 | Hollon | |
| 5,802,305 A | 9/1998 | McKaughan | |
| 5,875,345 A * | 2/1999 | Naito et al. | 713/323 |
| 5,959,622 A | 9/1999 | Greer | |
| 5,999,613 A | 12/1999 | Nabkel et al. | |
| 6,006,285 A | 12/1999 | Jacobs | |
| 6,032,256 A * | 2/2000 | Bernard | 726/34 |
| 6,052,442 A | 4/2000 | Cooper et al. | 379/88.19 |
| 6,101,610 A | 8/2000 | Beebe | |
| 6,128,744 A * | 10/2000 | Wang | 713/300 |
| 6,144,363 A | 11/2000 | Alloul | 345/618 |
| 6,144,644 A | 11/2000 | Bajzath et al. | 370/259 |
| 6,172,703 B1 | 1/2001 | Lee | 348/14.08 |
| 6,208,373 B1 | 3/2001 | Fong et al. | 348/14.16 |
| 6,215,420 B1 | 4/2001 | Harrison et al. | 341/22 |
| 6,237,846 B1 | 5/2001 | Lowell | |
| 6,240,168 B1 | 5/2001 | Stanford et al. | 379/110.01 |
| 6,260,111 B1 * | 7/2001 | Craig et al. | 711/115 |
| 6,266,714 B1 | 7/2001 | Jacobs | |
| 6,279,056 B1 | 8/2001 | Jacobs | |
| 6,282,435 B1 | 8/2001 | Wagner et al. | 455/566 |
| 6,346,934 B1 | 2/2002 | Wugofski | 345/158 |
| 6,362,440 B1 | 3/2002 | Karidis | |
| 6,380,968 B1 | 4/2002 | Alexander | |
| 6,417,849 B2 | 7/2002 | Lefebvre | |
| 6,438,585 B2 | 8/2002 | Mousseau | |
| 6,453,027 B1 | 9/2002 | Kang | |
| 6,483,905 B1 | 11/2002 | Kikinis | 379/93.24 |
| 6,507,356 B1 | 1/2003 | Jackel et al. | 348/14.06 |
| 6,513,128 B1 | 1/2003 | Wang | |
| 6,518,957 B1 | 2/2003 | Lehtinen et al. | |
| 6,519,335 B1 | 2/2003 | Bushnell | |
| 6,546,262 B1 | 4/2003 | Freadman | |
| 6,603,855 B1 | 8/2003 | Cannon et al. | 379/377 |
| 6,628,194 B1 | 9/2003 | Hellebust | 340/7.5 |
| 6,628,267 B2 | 9/2003 | Karidis | |
| 6,658,095 B1 | 12/2003 | Yoakum | |
| 6,671,356 B2 | 12/2003 | Lewis | 379/88.13 |
| 6,671,743 B1 | 12/2003 | Verity | 709/321 |
| 6,680,845 B2 | 1/2004 | Agata | |
| 6,691,233 B1 | 2/2004 | Gannage | |
| 6,718,183 B1 | 4/2004 | Blust | |
| 6,731,316 B2 | 5/2004 | Herigstad et al. | 715/864 |
| 6,741,232 B1 | 5/2004 | Siedlikowski | 345/156 |
| 6,757,372 B1 | 6/2004 | Dunlap et al. | 379/142 |
| 6,806,867 B1 | 10/2004 | Arruda | |
| 6,819,961 B2 | 11/2004 | Jacobs | |
| 6,831,657 B2 | 12/2004 | Tsutsumi et al. | 345/589 |
| 6,882,326 B2 | 4/2005 | Hirayama | 345/1.1 |
| 6,888,562 B2 | 5/2005 | Rambo et al. | 348/14.16 |
| 6,892,074 B2 | 5/2005 | Tarkiainen | 455/466 |
| 6,897,851 B2 | 5/2005 | Carini | |
| 6,902,332 B2 | 6/2005 | McLoone | 400/472 |
| 6,912,283 B2 | 6/2005 | Meyerson et al. | 379/428.04 |
| 6,937,950 B2 | 8/2005 | Cragun | |
| 6,938,174 B2 | 8/2005 | LeKuch | |
| 6,970,556 B2 | 11/2005 | Wall et al. | 379/355.01 |
| 6,973,167 B2 | 12/2005 | Kikinis | 379/67.1 |
| 6,976,216 B1 | 12/2005 | Peskin et al. | 715/716 |
| 6,980,641 B1 | 12/2005 | Stanford et al. | 379/387 |
| 6,996,445 B1 | 2/2006 | Kamijo | 700/94 |
| 7,036,110 B2 | 4/2006 | Jeyaraman | |
| 7,096,391 B2 | 8/2006 | Johnson | |
| 7,123,370 B2 | 10/2006 | Watanabe | |
| 7,221,331 B2 | 5/2007 | Bear | |
| 7,231,229 B1 | 6/2007 | Hawkins | |
| 7,240,228 B2 * | 7/2007 | Bear et al. | 713/320 |
| 7,243,130 B2 | 7/2007 | Horvitz | |
| 7,272,660 B1 | 9/2007 | Powers | |
| 7,302,637 B1 | 11/2007 | Maguire | |
| 2001/0040551 A1 | 11/2001 | Yates et al. | 345/156 |
| 2002/0015020 A1 | 2/2002 | Mobin | 345/156 |
| 2002/0080967 A1 | 6/2002 | Abdo | |
| 2002/0087225 A1 | 7/2002 | Howard | |
| 2002/0126882 A1 * | 9/2002 | Funahashi | 382/124 |
| 2002/0131072 A1 | 9/2002 | Jackson | |
| 2002/0167458 A1 | 11/2002 | Baudisch | |
| 2002/0167460 A1 | 11/2002 | Baudisch | |
| 2003/0021290 A1 | 1/2003 | Jones | 370/466 |
| 2003/0025674 A1 | 2/2003 | Watanabe | |
| 2003/0037180 A1 | 2/2003 | Madineni et al. | 709/321 |
| 2003/0069689 A1 | 4/2003 | Ihara | |
| 2003/0074590 A1 * | 4/2003 | Fogle et al. | 713/320 |
| 2003/0112325 A1 | 6/2003 | Boyden et al. | 348/14.16 |
| 2003/0122874 A1 | 7/2003 | Dieberger | |
| 2003/0131148 A1 | 7/2003 | Kelley et al. | 717/101 |
| 2003/0146903 A1 | 8/2003 | Yi | |
| 2003/0159044 A1 * | 8/2003 | Doyle et al. | 713/176 |
| 2003/0188041 A1 | 10/2003 | Fillmore | |
| 2003/0197685 A1 | 10/2003 | Yi | |
| 2003/0227471 A1 | 12/2003 | Eglit | |
| 2004/0114032 A1 | 6/2004 | Kakii | 348/14.08 |
| 2004/0135819 A1 | 7/2004 | Maa | |
| 2004/0141012 A1 | 7/2004 | Tootill | 345/827 |
| 2004/0155956 A1 | 8/2004 | Libbey | 348/14.16 |
| 2004/0177361 A1 | 9/2004 | Bernhard et al. | 719/321 |
| 2004/0222977 A1 | 11/2004 | Bear | 340/815.4 |
| 2004/0222978 A1 | 11/2004 | Bear | 345/172 |
| 2004/0223058 A1 | 11/2004 | Richter | |
| 2004/0223061 A1 | 11/2004 | Bear | 348/207.1 |
| 2004/0223599 A1 | 11/2004 | Bear | 379/215.01 |
| 2004/0225502 A1 | 11/2004 | Bear | 704/270 |
| 2004/0225892 A1 | 11/2004 | Bear | 726/2 |
| 2004/0225901 A1 | 11/2004 | Bear | 713/300 |
| 2004/0240167 A1 | 12/2004 | Ledbetter et al. | 361/683 |
| 2004/0240650 A1 | 12/2004 | Bear | 455/426.1 |
| 2005/0068423 A1 | 3/2005 | Bear | 345/156 |
| 2005/0069101 A1 | 3/2005 | Bear | 379/90.01 |
| 2005/0071437 A1 | 3/2005 | Bear | 713/1 |
| 2005/0071626 A1 | 3/2005 | Bear | 713/1 |
| 2005/0182822 A1 | 8/2005 | Daniel | |
| 2005/0186942 A1 | 8/2005 | Griffin | |
| 2005/0193396 A1 | 9/2005 | Stafford-Fraser | |
| 2006/0007051 A1 | 1/2006 | Bear | 345/1.1 |
| 2006/0048062 A1 | 3/2006 | Adamson | |
| 2006/0061516 A1 | 3/2006 | Campbell | |
| 2006/0095525 A1 | 5/2006 | Mousseau | |
| 2006/0130075 A1 | 6/2006 | Rhoten | 719/328 |
| 2006/0164324 A1 | 7/2006 | Polivy | 709/206 |
| 2006/0284787 A1 | 12/2006 | Bear | |

FOREIGN PATENT DOCUMENTS

| | | |
|---|---|---|
| EP | 0777394 A1 | 6/1997 |
| EP | 000816990 | 1/1998 |
| EP | 0838934 A1 | 4/1998 |
| EP | 0772327 A3 | 2/1999 |
| WO | WO9602049 A1 | 1/1996 |

OTHER PUBLICATIONS

Anonymous, International Search Report in Corresponding EP Application No. EP 04 00 9868.
U.S. Appl. No. 11/509,437, filed Aug. 23, 2006, Bear.
U.S. Appl. No. 11/559,821, filed Nov. 14, 2006, Bear.
U.S. Appl. No. 11/685,014, filed Mar. 12, 2007, Bear.
U.S. Appl. No. 11/837,302, filed Aug. 10, 2007, Bear.
Office Action dated Aug. 8, 2007 cited in related U.S. Appl. No. 10/996,371.

Office Action dated Jul. 31, 2007 cited in related U.S. Appl. No. 10/677,084.
Office Action dated Jul. 27, 2007 cited in related U.S. Appl. No. 10/996,557.
Office Action dated Jul. 6, 2007 cited in related U.S. Appl. No. 10/429,943.
Notice of Allowance dated Sep. 7, 2007 cited in related U.S. Appl. No. 10/429,931.
Office Action dated Sep. 24, 2007 cited in related U.S. Appl. No. 10/429,933.
Office Action dated Feb. 15, 2007 cited in related U.S. Appl. No. 10/429,933.
Notice of Allowance dated Jan. 30, 2008 cited in related U.S. Appl. No. 10/429,931.
Office Action dated Mar. 21, 2008 cited in related U.S. Appl. No. 10/996,557.
Office Action dated Feb. 28, 2007 cited in related U.S. Appl. No. 10/996,371.
Office Action dated Sep. 28, 2007 cited in related U.S. Appl. No. 10/429,943.
Office Action dated Mar. 26, 2008 cited in related U.S. Appl. No. 10/428,943.
Office Action dated Mar. 18, 2008 cited in related U.S. Appl. No. 10/677,118.
Office Action dated Oct. 15, 2007 cited in related U.S. Appl. No. 10/429,903.
Notice of Allowance dated Apr. 2, 2008 cited in related U.S. Appl. No. 10/429,903.
Office Action dated Jan. 11, 2008 cited in related U.S Appl. No. 10/677,084.
Notice of Allowance dated Apr. 29, 2008 cited in related U.S. Appl. No. 10/677,084.

* cited by examiner

METHOD AND SYSTEM FOR ACTIVATING A COMPUTER SYSTEM

CROSS-REFERENCE TO RELATED APPLICATIONS

The present invention is related to the following copending United States Patent Applications filed concurrently herewith, assigned to the assignee of the present invention, and hereby incorporated by reference in their entireties:

"Method and System for Auxiliary Display of Information for a Computing Device," Ser. No. 10/429,932;

"Real-Time Communications Architecture and Methods for use with a Personal Computer System," Ser. No. 10/429,905;

"Record Button on a Computer System," Ser. No. 10/429,904;

"Method and System for Auxiliary Processing of Information for a Computing Device," Ser. No. 10/429,930;

"Computer System with Do Not Disturb System and Method," Ser. No. 10/429,903;

"Computer Camera System and Method for Reducing Parallax," Ser. No. 10/429,943;

"Control and Communications Panel for a Computer System," Ser. No. 10/429,933; and "Notification Lights, Locations and Rules for a Computer System," Ser. No. 10/429,931.

FIELD OF THE INVENTION

The invention relates generally to computer systems, and more particularly to an improved method and system for activating a computer system.

BACKGROUND OF THE INVENTION

Computer users typically activate their computers using a combination of a power button and a password. Many users shut down their computers at the end of the day and then must restart them the next morning. Even with improvements in boot time, restarting the computer often takes several minutes.

At the same time, although some contemporary computers provide card key access such as a smartcard, they often require a user to login into accounts using a password. In some cases, users are required to enter two passwords to gain system access. Powering up a computer and then logging in can be a time consuming and cumbersome process.

What is needed is a simplified way to provide secure access and easy activation of a computer.

SUMMARY OF THE INVENTION

Briefly, the present invention provides a system and method for improved activation of a personal computer and/or other processing devices where it is desirable to provide secure access and easy activation. Power and security states are combined and further reduced to three activation states which may be operated by a single secure device. The system may include any number of activation states for operating the computer using only the single secure device.

The secure access device of the present invention may handle both security and power management by authenticating physical access to the computer and the identity of the user. For this purpose, an exemplary device containing a biometric reader may be combined with a smart card and the biometric identification used as an authentication code to secure the smartcard. In one exemplary embodiment, the smartcard device is integrated with the biometric thumb sensor as a key which may be inserted into a locking mechanism used by the user to transition between activation states.

In general, a computer user may easily transition the system between activation modes such as On, Standby and Off by using the single secure activation device. Other advantages will become apparent from the following detailed description when taken in conjunction with the drawings, in which:

DETAILED DESCRIPTION

Exemplary Operating Environment

Figure 1:
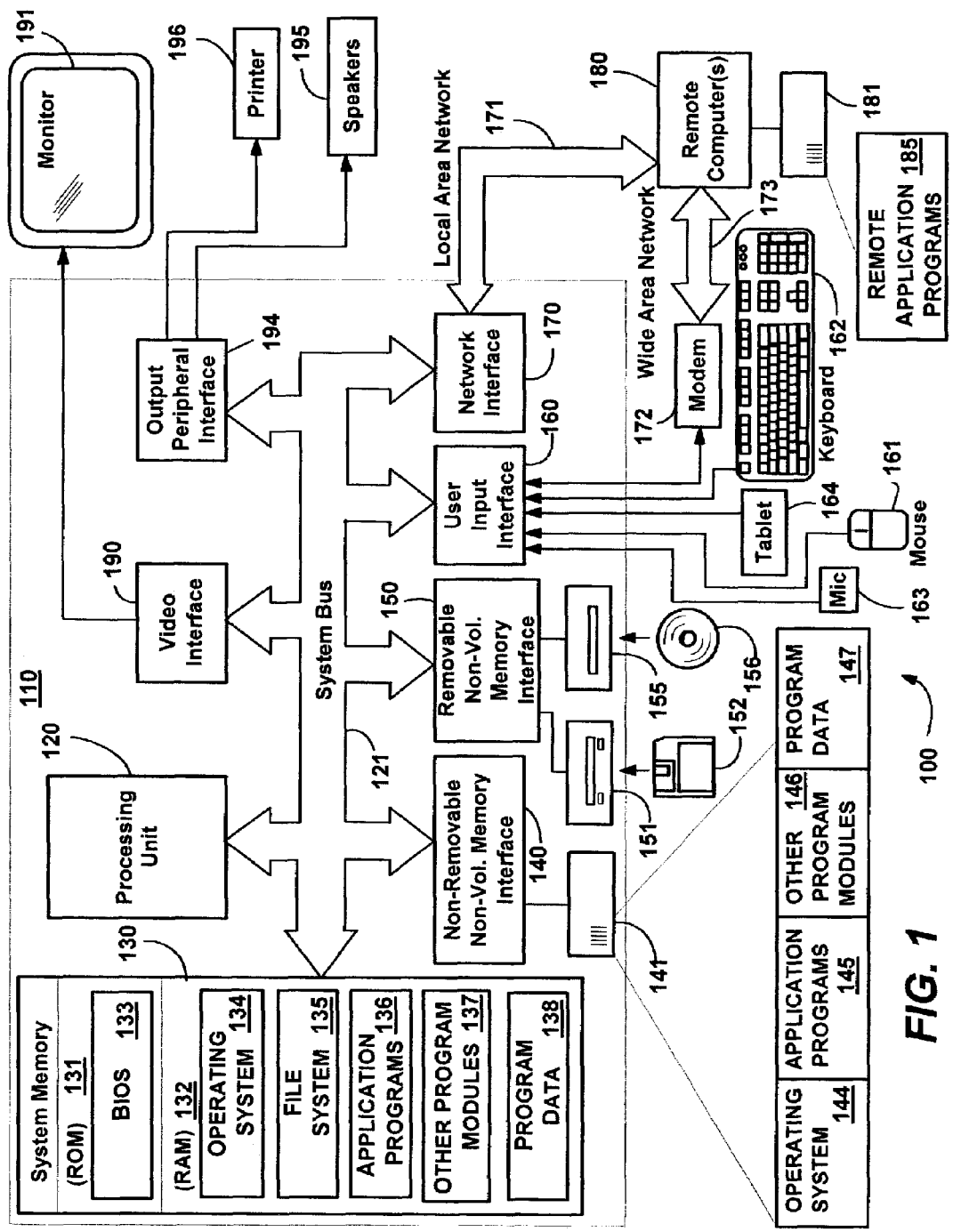
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, headless servers, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110.

Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, file system 135, application programs 136, other program modules 137, and program data 138.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 136, other program modules 137, and program data 138. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as a mouse, trackball or touch pad. Other input devices not shown in FIG. 1 may include a joystick, game pad, satellite dish, scanner, or other devices including a device that contains a biometric sensor, environmental sensor, position sensor, or other type of sensor. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

System Activation Combining Power and Security

The present invention is generally directed towards activating a computer system with a simplified security and power architecture. To that end, a system and method are described for improved activation of a personal computer and/or other processing devices where it is desirable to provide secure access and simple activation. Power and security states are combined and further reduced to three activation states which may be operated by a single secure device. The system provides three user-perceived activation states for operating the computer using only a single secure device. As will be understood, the various state diagrams, devices and scenarios described herein are only examples, and there are many other scenarios to which the present invention will apply.

Figure 2:
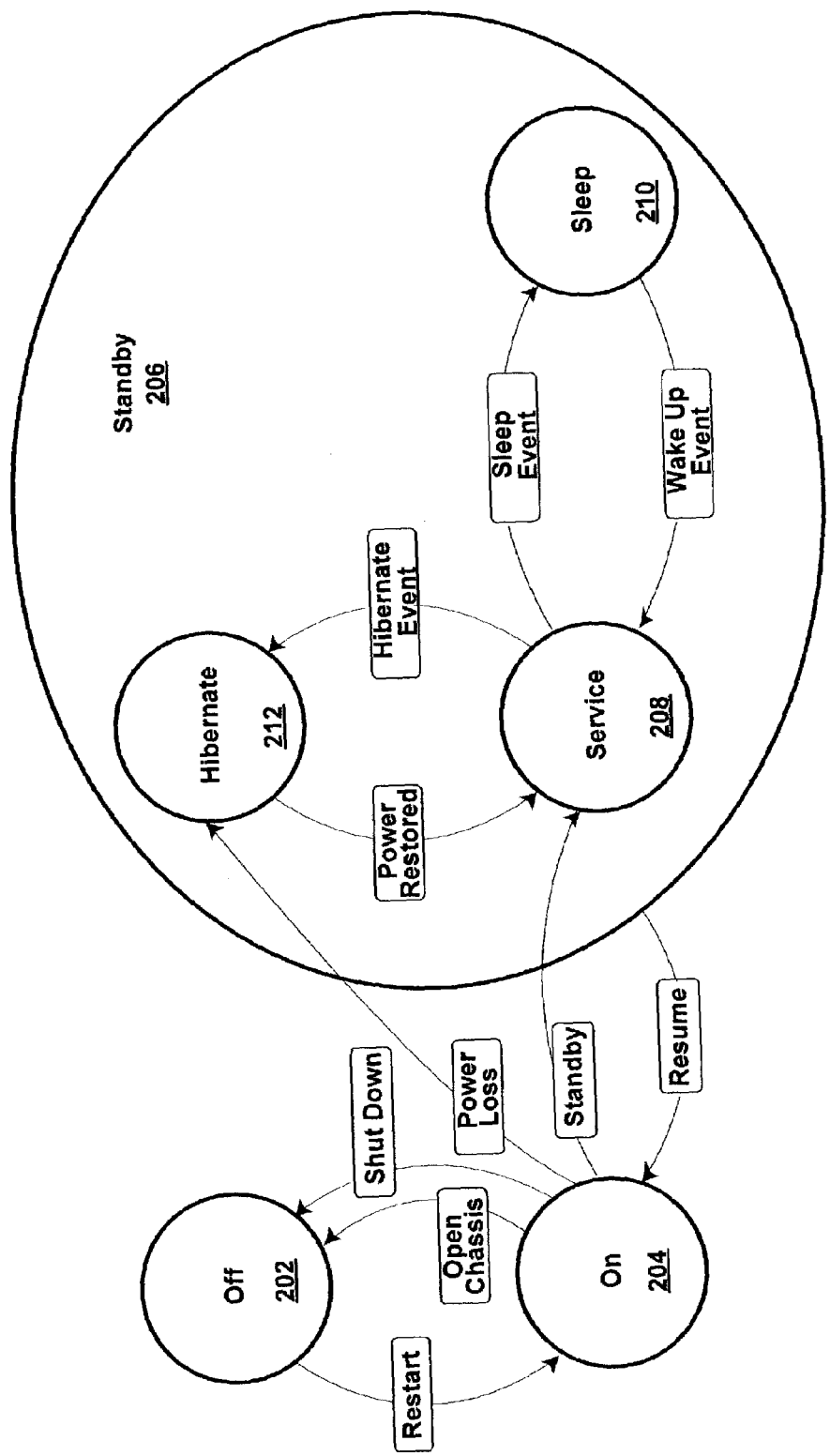
FIG. 2 is a state diagram generally illustrating the power states of a computing device for power management in accordance with an aspect of the present invention.

Turning to FIG. 2 of the drawings, there is shown a state diagram generally illustrating the power states of computer 110 for power state management of the present invention. More particularly, the state diagram illustrates three main power states for operation and the actions associated with the transition between the states. There are three main states: Off 202, On 204 and Standby 206. Additionally, Standby 206 has three sub-states: Service 208, Sleep 210 and Hibernate 212. Before computer 110 is powered on, the system is in Off state 202 with the monitor off. If a restart event occurs, the system transitions from the Off state 202 to the On state 204. One example of a restart event is when a user presses the power button (with the power supply switch on, if present). This powers up the system and transitions the system to the On state 204 and begins the user session. The system is fully operational in the On state 204 with the monitor turned on. In this state, the system manages devices' and the processing unit's 120 power states dynamically. The system is fully interactive with the user.

If a standby event occurs while the system is in the On state 204, the system transitions from the On state 204 to the Standby state 206. For example, a standby event occurs whenever the user signifies the intention to end the user session, such as by pressing the power button while in the On state 204. Alternatively, the user may generate a standby event by turning off the system through the user interface, such as by clicking the Turn Off Computer option in the Start menu of the Windows® XP operating system. If computer 110 is a mobile personal computer, then the user may also generate a standby event by closing the lid of the mobile computer. Yet again, the user session timer may expire due to inactivity for a period of time, and thereby generate a standby event.

When the system transitions from the On state 204 to the Standby state 206, the power management routines of the operating system turn off the main monitor, spin down the hard drives, and shut off the system fans. When the system first enters the Standby state 206, it transitions to the Service sub-state 208 for a predetermined period to process any background tasks pending and advantageously allows the user to quickly transition back from the Standby state 206 to the On state 204 in case the user changes his mind. When the predetermined time expires from user inactivity and there are no background tasks to process, a sleep event is generated and the system transitions from the Service sub-state 208 to the Sleep sub-state 210 within the Standby state 206.

Whenever a wake-up event occurs while the system is in the Sleep sub-state 210, the system transitions from the Sleep sub-state 210 back to the Service sub-state 208 within the Standby state 206. Any incoming communications activity that occurs such as a LAN, modem or USB device activity can be a wake-up event. An application or system service request from an auxiliary processor, if present, can also be a wake-up event. As will be appreciated by those skilled in the art, these are illustrative examples of wake-up events and there are other ways of generating a wake-up event such as from operating system timers.

If a hibernate event occurs while the system is in the Service sub-state 208, the system transitions from the Service sub-state 208 to the Hibernate sub-state 212. A hibernate event occurs whenever power is lost, a critical battery alarm occurs for a mobile personal computer, or a hibernate-timer event occurs. When power is restored, the system returns to Service sub-state 208 from Hibernate sub-state 212 and processes any outstanding background events.

While in the Service sub-state 208, the system may perform background processing to monitor and service activities like incoming communications. Phone calls, emails, instant messages and other incoming communications, meeting reminders, system alerts, and information from Internet subscription services may all trigger a wake-up event for service while the system is in Standby state 206. For example, an email program may be executed in the background to process an incoming email message received on a LAN while the system is in Standby state 206. In processing the email, the email program will send a notification that a new email has arrived. This notification may be forwarded for display on an auxiliary display, if present, to notify the user. If there are no further background tasks to process before the inactivity timer expires, the system transitions from Service sub-state 208 to Sleep sub-state 210.

If the user wishes to return to the fully operational system, the user may transition to the On 204 state from any sub-state of the Standby state 206 with the user context preserved. The system transitions from any sub-state of Standby state 206 to the On state 204 whenever a resume event occurs. For example, a resume event occurs whenever the user signifies the intention to return to the user session, such as by pressing the power button while in the Standby state 206. It will be appreciated by those skilled in the art that there are other ways of generating a resume event, such as opening the lid of a mobile computer. When the system transitions into the On state 204, the power management routines of the operating system turn back on the main monitor, spin the hard drives, and turn back on the system fans.

In addition to transitioning from the On state 204 to the Standby state 206 by the occurrence of a standby event already previously described, the system may also transition to the Hibernate sub-state of Standby state 206 if a power loss occurs while in On state 204. Finally, the system may transition from the On state 204 to the Off state 202 upon the occurrence of either a open-chassis event or a shutdown event. An open-chassis event occurs when the processing unit's 120 chassis is opened. A shutdown event may occur whenever the user depresses the power button for several seconds. Alternatively, the user may generate a shutdown event by shutting down the system through the user interface, such as clicking the Turn Off Computer option in the Start menu of the Windows® XP operating system and then selecting the Shut Down option.

In the Off 202 state, the operating system of the computer 110 is shut down and the user context is discarded. When the computer 110 is in the Off 202 state, it is safe for the user to remove power and open the chassis of the computer 110 to upgrade or repair the hardware.

It will be appreciate by those skilled in the art that the state diagram illustrated in FIG. 2 is an exemplary diagram and that the present invention may be practiced by using modifications of the state diagram such as by combining the Sleep sub-state and the Hibernate sub-state. In that case, the system would transition from the Service sub-state 208 to such a combined state upon the occurrence of either a hibernate event or a sleep event.

Figure 3:
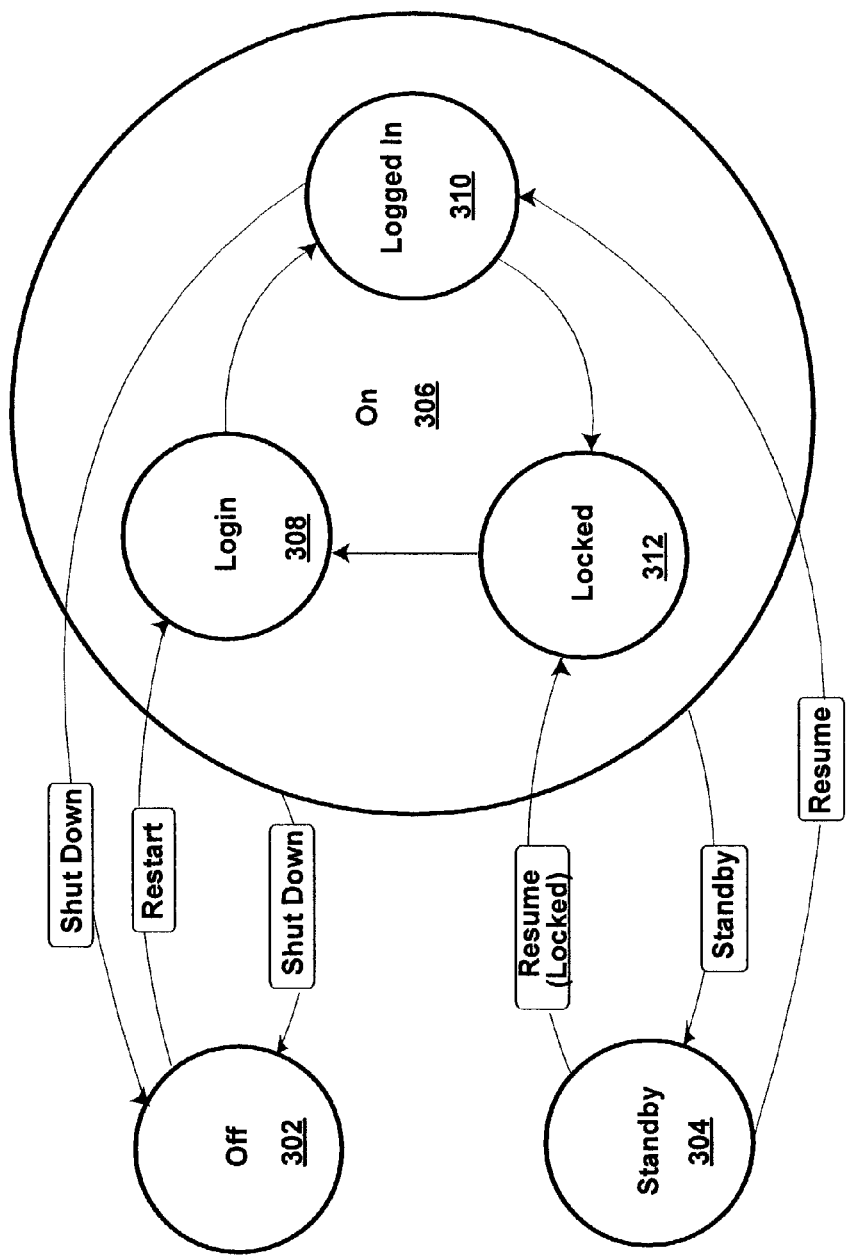
FIG. 3 is a state diagram generally illustrating the security states of a computing device for security management in accordance with an aspect of the present invention.

FIG. 3 presents a state diagram generally illustrating the security states of computer 110 for security management of the present invention. More particularly, the state diagram illustrates three main security states and the actions associated with the transition between the states. Corresponding to the three main power states described above, there are three main security states: Off 302, On 306 and Standby 304. Additionally, the On state 306 has three sub-states: Login 308, Logged In 310 and Locked 312. Before computer 110 is powered on, the system is in Off state 302 with the monitor off. If a restart event occurs, the system transitions from the Off state 302 to the On state 306. One example of a restart event is when a user presses the power button (with the power supply switch on, if present). This powers up the system and transitions the system to the Login sub-state 308 within the On state 306 and begins the user session with a login procedure. The login procedure may use a biometric or smartcard authentication device and/or may alternatively use a login/authorization (e.g., personal identification number screen. If the login procedure is successful, the user is authenticated and the system transitions to the Logged In sub-state 310. The system is fully operational in the On state 306 with the monitor turned on. In this state, the system manages security access to system resources and data and is fully active with the user.

If the user wishes to change the login password, the user may enter into the user interface security dialog by pressing the system Security Button, if present, or may enter into the user interface security dialog through the user interface, such as by choosing the User Accounts menu option from the Control Panel in the Windows® XP operating system. Those skilled in the art will appreciate that more than one logout timer may be used by the present invention. In one such embodiment, there may be a logout timer for the On power state 204 and another for the Standby power state 206.

If the logout timer expires while in the Logged In sub-state 310, the system transitions to the Locked sub-state 312. While in the Locked sub-state 312, the functionality of the computer 110 is unavailable through the main system interfaces except for the login procedure. The system remains in the Locked sub-state 312 until the user presses the Security Button, if present, or any other button which transitions the system to the Login sub-state 308 where the user may enter into the login procedure.

If a shutdown event occurs while the system is in the On state 306, the system will transition to the Off state 302 upon the occurrence of a shutdown event. A shutdown event automatically logs the user off the system. A shutdown event may occur in any of several ways such as whenever the user depresses the power button for several seconds or logs out of the system through the user interface by entering the logout procedure. The user may also enter into the security dialog by pressing the system Security Button, if present, and then enter the logout procedure. Alternatively, the user may generate a shutdown event by shutting down the system through the user interface, such as clicking the Turn Off Computer option in the Start menu of the Windows® XP.

The system may also transition from the On state 306 to the Standby state 304 whenever a standby event occurs. For example, a standby event occurs whenever the user signifies the intention to end the user session, such as by pressing the power button while in the On state 306. Alternatively, the user may generate a standby event by turning off the system through the user interface, such as clicking the Turn off Computer option in the Start menu of the Windows® XP operating system. If the computer 110 is a mobile personal computer, then the user may also generate a standby event by closing the lid of the mobile computer. Yet again, the user session timer may expire due to inactivity for a period of time, and thereby generate a standby event. When the system enters Standby state 304, the power management routines of the operating system turn off the main monitor, spin down the hard drives, and shut off the system fans.

Finally, the system transitions from the Standby state 304 to the On state 306 upon occurrence of a resume event. For example, a resume event occurs whenever the user signifies the intention to return to the user session, such as by pressing the power button while in the Standby state 304. It will be appreciated by those skilled in the art that there are other ways of generating a resume event, such as opening the lid of a mobile computer. When the system transitions into the On state 306, the power management routines of the operating system turn back on the main monitor, spin the hard drives, and turn back on the system fans. If the logout timer is expired when the resume event occurs, the system transitions to Locked sub-state 312 within the On state 306. If, however, the logout timer is not expired or is not set, then the system transitions to the Logged In sub-state 310 of the On state 306 when the resume event occurs.

It will be appreciate by those skilled in the art that the security state diagram illustrated in FIG. 3 is an exemplary diagram and that the present invention may be practiced by using modifications of the security state diagram such as by combining the Login sub-state and the Locked sub-state. In that case, the system would transition to such a combined security state from the Off state 302 upon a restart event and from the Standby state 304 upon a resume-locked event.

Figure 4:
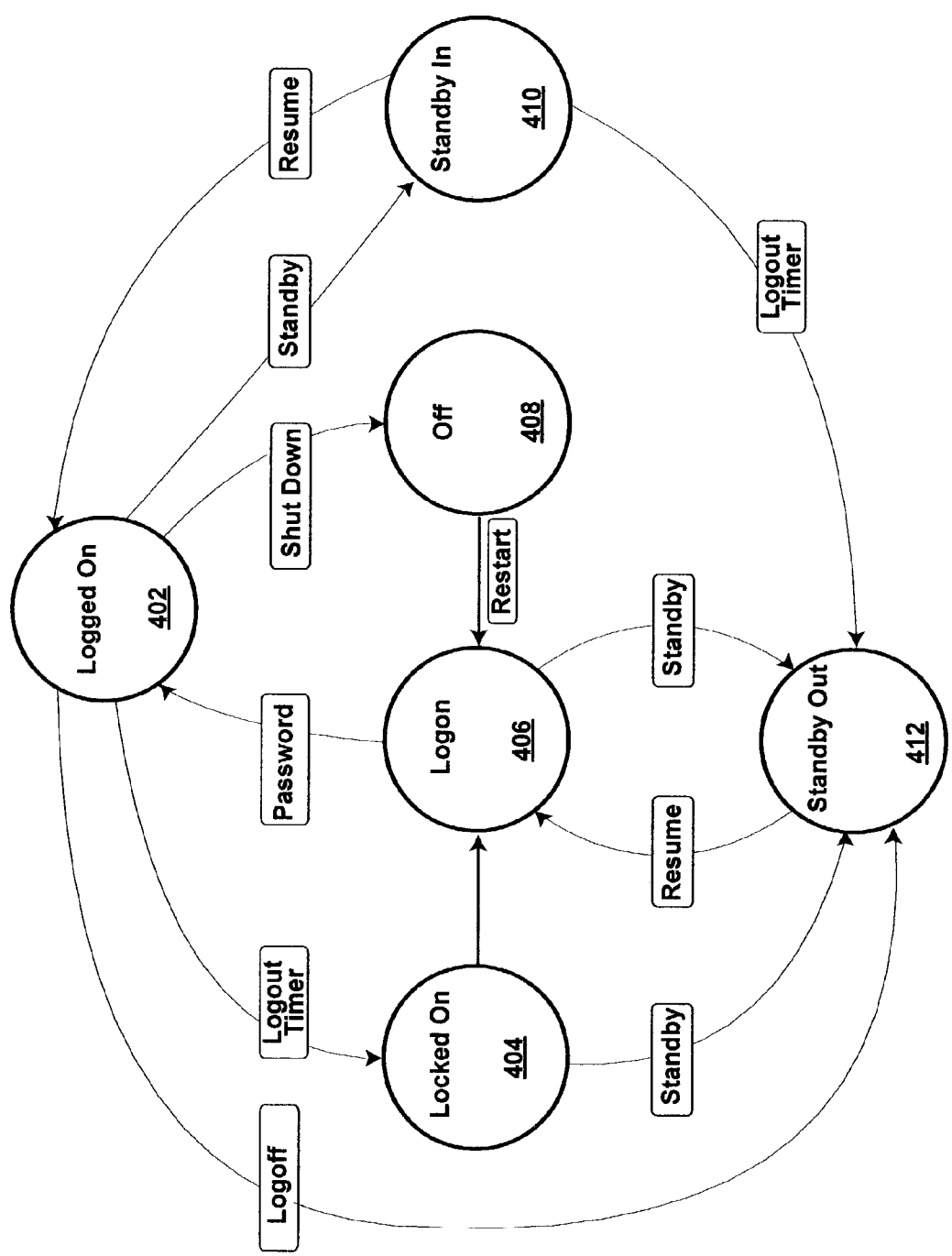
FIG. 4 is a state diagram generally illustrating the activation states of a computing device for combined power and security management in accordance with an aspect of the present invention.

FIG. 4 is a state diagram generally illustrating the activation states of a computing device for combined power and security management. More particularly, the state diagram illustrates six states from combining the power and security states of FIGS. 2-3 and also shows the actions associated with the transition between the states. Before computer 110 is powered on, the system is in Off state 408 with the monitor turned off. If a restart event occurs, the system transitions from the Off state 408 to the Logon state 406. This powers up the system and begins the user session with a login procedure. The login procedure may use a biometric or smartcard authentication device or may alternatively use a login screen. If the login procedure is unsuccessful, the system transitions to the Standby Out state 412. In Standby Out state 412 the user is not logged on the system and the system is powered down in the Standby Out state. If the login procedure is successful, the user is authenticated and the system transitions to the Logged On state 402. The system is fully operational in the Logged On state 402. In this state, the system manages security access to system resources and data, and the system is fully active with the user.

While in the Logged On state 402, there may occur a logout event, a logout timer event, a shutdown event or a standby event. The user may generate a logout event by activating the log out procedure to log off the computer. If there is a logout event, then the system transitions to the Standby Out state 412. If there is a logout timer event, then the system transitions to the Locked On state 404. From there the system transitions to the Logon state 406 if the login procedure is available. Otherwise, if the login procedure is not available, the system will transition to the Standby Out state 412 because a standby event will occur as a result of the user session timer expiring due to inactivity. If there is a shutdown event, then the system transitions to the Off state 408. Finally, if the user session timer expires due to inactivity while in Logged On state 402, then the system transitions to Standby In state 410.

If a resume event occurs while the system is in the Standby In state 410, then the system transitions back to the Logged On state 402. If, however, the logout timer event occurs, the system transitions to the Standby Out state 412. The system will remain in Standby Out state 412 until a resume event occurs.

Figure 5:
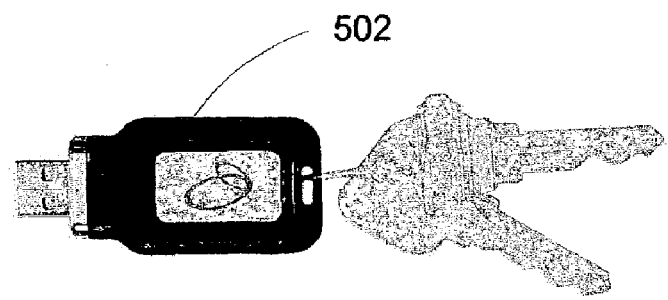
FIG. 5 is an exemplary illustration generally representing a single secure access key device used for system activation and related operation in accordance with an aspect of the present invention.

The activation states of FIG. 4 resulting from combining the power and security states of FIGS. 2-3 may be advantageously reduced to three activation states to simplify secure activation of the computer. By using a single secure device that handles both security and power management, a user may then activate the computer and transition between the three states. FIG. 5 presents an exemplary illustration generally representing a single secure access key device used for system activation and related operation. For example, a single key may handle both security and power management by authenticating physical access to the computer and the identity of the user. For this purpose, a biometric identification can be used as an authentication code to secure a smartcard, e.g., the biometric identification may act as a personal identification number (PIN) rather than a code. Accordingly, a smart card device integrated with a biometric reader can provide both confirmation for physical access and confirmation of the identity of the user. In one exemplary embodiment, the smartcard device is integrated with the biometric thumb sensor as a key 502 with a universal serial bus connection as illustrated in FIG. 5. Those skilled in the art will appreciate that there are biometric measure which may be used to confirm the identity of the user for use in authenticating a smartcard.

Figure 6:
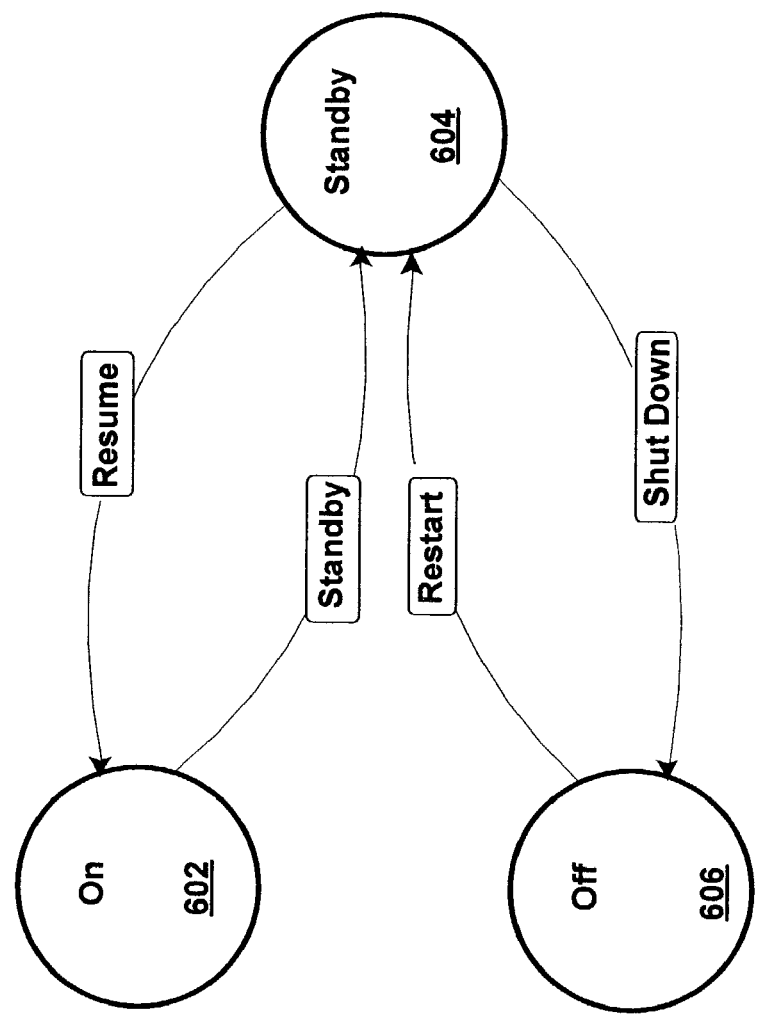
FIG. 6 is a state diagram generally illustrating the activation states of a computing device for a single secure access device in accordance with an aspect of the present invention.

FIG. 6 is a state diagram generally illustrating the activation states of a computing device for a single secure access device. More particularly, the state diagram illustrates three activation states and the actions associated with the transition between the states. Before computer 110 is powered on, the system is in the Off state 606 with the monitor turned off. By using a single secure activation device, the system may be transitioned from the Off state 606 to the Standby state 604. This powers up the system in standby mode with the monitor still off and the system locked. By using the single secure activation device, the system may then be transitioned from the Standby state 604 to the On state 602. In the On state 602, the system is fully operational with the monitor turned on and the system is fully active with the user. From the On state 602, the system may be transitioned back to the Standby state 604 using the single secure activation device and the user may leave the computer securely locked in that state without the need to perform a shutdown. When the user returns to the computer, the user may use the single secure activation device to transition the system back to the On state 602. If the computer needs to be shutdown for hardware upgrades or repairs, the user can transition the system from the Standby state 604 to the Off state 606 using the single secure activation device.

Figure 7:
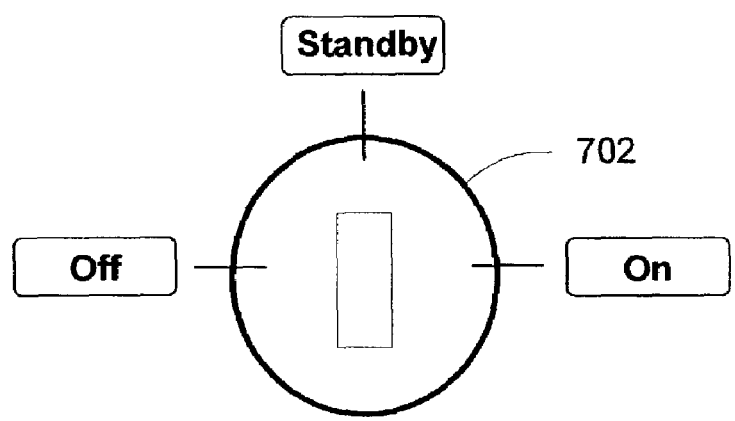
FIG. 7 is an exemplary illustration generally representing a secure access lock for activating the computing device using a single secure access key in accordance with an aspect of the present invention.

FIG. 7 is an exemplary illustration generally representing a secure access lock for activating the computing device using a single secure access key. The lock 702 may be able to rotate to several positions. For example, there are three positions shown in FIG. 7 corresponding to the three activation states described in FIG. 6. The key 502 may be inserted in the USB connector of the lock 702 which may be initially in the Standby position. A user may then rotate the key to the On or Off position. Furthermore, the lock mechanism may be placed anywhere on the computer system for ease and convenience of access, including the CPU housing, the monitor, the keyboard, and so forth.

By simplifying the security and power architecture, the present invention provides three user-perceived activation states. Those skilled in the art will appreciate that the present invention may be used to transition the computer to other access modes such as a fourth state such as Do Not Disturb, a state where the computer is fully operational but incoming communications are handled differently, and so forth, as described in the related patent application Ser. No. 10/429,903, entitled "Computer System with Do Not Disturb System and Method," In simplifying activation and change of modality of computing devices for users, the method and system described herein provides significant advantages and benefits where it is desirable to provide secure access and simple activation.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A system, comprising:
   a computing system;
   wherein the computing system comprises a security system and a power management system, the security system comprising two or more security states and the power management system comprising two or more power states, wherein the power states comprise off, standby, and on, wherein the standby power state further comprises sub-states hibernate, service, and sleep, and the security states comprise off, on, and standby, wherein the on security state further comprises sub-states login, logged in, and locked,
   computer storage media including at least one memory storage device;
   a device enabled to control the power management system and the security system of the computing system;
   the device being enabled to accept a secure access device; and wherein the device is configured to control the computing system transitioning from the on power state to the standby power state by causing the computing system to turn off a main monitor, spin down a hard drive, and shut off system fans and enter the service sub-state for a predetermined period to process any pending background tasks; and
   when determining that the computing system has been in the service sub-state for the predetermined period and no pending background tasks to process, causing a sleep event to be generated and the computing system to transition from the service sub-state to the sleep sub-state.

2. The system of claim 1 wherein the secure access device comprises a biometric identification device.

3. The system of claim 1 wherein the secure access device comprises a smartcard device.

4. The system of claim 2 wherein the biometric identification device is integrated with a smartcard device.

5. The system of claim 1 wherein transitions between power states are enabled by events comprising:
   a restart event causes a transition from off to on;
   an open chassis event or a shut down event causes a transition from on to off;
   a power loss event causes a transition from on to hibernate;
   a standby event causes a transition from on to service;
   a power restored event causes a transition from hibernate to service;
   a hibernate event causes a transition from service to hibernate;
   a sleep event causes a transition from service to sleep;
   a wake up event causes a transition from sleep to service; and
   a resume event causes a transition from each of hibernate, service and sleep to on.

6. The system of claim 1 wherein transitions between security states are enabled by events comprising:
   a restart event causes a transition from off to login;
   a shutdown event causes a transition from each of login, logged in, and locked to off; and
   a resume event causes a transition from standby to one of logged in or locked.

7. A method of integrating and simultaneously managing power management and security management of a computing system, the computing system comprising a security system and a power management system, the security system comprising two or more security states and the power management system comprising two or more power states, the method comprising:
   providing a single device enabled to control the power management system and enabled to control the security system,
   the power management system having power states comprising off, standby, and on, wherein the standby power state further comprises sub-states hibernate, service, and sleep,
   the security system having security states comprising off, on, and standby, wherein the on security state further comprises sub-states login, logged in, and locked, and
   the device being enabled to accept a secure access device;
   accepting input from the device, the device having accepted the secure access device;
   selecting states for the security system and the power management system based upon state of the device, the secure access device, and one or more events;
   a transition from the on power state to the standby power state causing the computing system to turn off a main monitor, spin down a hard drive, and shut off system fans and enter a service sub-state for a predetermined period to process any background tasks pending; and
   when having been in the service sub-state for the predetermined period and no pending background tasks to process, generating a sleep event and causing a transition from the service sub-state to the sleep sub-state.

8. The method of claim 7 wherein the secure access device comprises a biometric identification device.

9. The method of claim 7 wherein the secure access device comprises a smartcard device.

10. The method of claim 8 wherein the biometric identification device is incorporated with a smartcard device.

11. The method of claim 7 further comprising:
    a restart event causing a transition from power state off to on;
    an open chassis event or a shut down event causing a transition from power state on to off;
    a power loss event causing a transition from power state on to hibernate;
    a standby event causing a transition from power state on to service;
    a power restored event causing a transition from power state hibernate to service;
    a hibernate event causing a transition from power state service to hibernate;
    a sleep event causing a transition from power state service to sleep;
    a wake up event causing a transition from power state sleep to service; and
    a resume event causing a transition from each of power states hibernate, service and sleep to on.

12. The method of claim 7 further comprising:
    a restart event causing a transition from security state off to login;
    a shutdown event causing a transition from each of security states login, logged in, and locked to off; and
    a resume event causing a transition from security state standby to one of logged in or locked.

13. A computer program product comprising instructions stored in one or more computer readable media to execute the method recited in claim 7.

14. The computer program product of claim 13 wherein the secure access device comprises a biometric identification device.

15. The computer program product of claim 13 wherein the secure access device comprises a smartcard device.

16. The computer program product of claim 13 wherein the method further comprises:
    a restart event causing a transition from power state off to on;
    an open chassis event or a shut down event causing a transition from power state on to off;
    a power loss event causing a transition from power state on to hibernate;
    a standby event causing a transition from power state on to service;
    a power restored event causing a transition from power state hibernate to service;
    a hibernate event causing a transition from power state service to hibernate;
    a sleep event causing a transition from power state service to sleep;
    a wake up event causing a transition from power state sleep to service; and
    a resume event causing a transition from each of power states hibernate, service and sleep to on.

17. The computer program product of claim 13 wherein the method further comprises:
    a restart event causing a transition from security state off to login;
    a shutdown event causing a transition from each of security states login, logged in, and locked to off; and
    a resume event causing a transition from security state standby to one of logged in or locked.

* * * * *